May 28, 1935.  J. BLISS  2,003,132

AIR LINE OILER

Filed March 24, 1934

Inventor:
John Bliss
By Byrnes, Stebbins &
Blenko, Attys.

Patented May 28, 1935

2,003,132

UNITED STATES PATENT OFFICE 2,003,132

AIR-LINE OILER

John Bliss, London, England, assignor to C. C. Wakefield & Company Limited, London, England, a British company Application March 24, 1934, Serial No. 717,256
In Great Britain April 7, 1933

15 Claims. (Cl. 184—55)

This invention consists in improvements in or relating to air-line oilers for rock-drills and other tools or apparatus in which live air, that is air under pressure, is supplied to the tool for driving it. It is desirable in order to lubricate the internal mechanism of the tool, to introduce lubricant into the live air stream passing to the tool and devices for this purpose are termed "air-line oilers".

The present invention is applied to an air-line oiler of the type comprising in combination a lubricant reservoir which discharges its contents gradually into an airway through one or more communicating orifices, means to introduce live air into the lubricant reservoir at substantially the pressure of the live air in the airway when the oiler is in operation, and a valve which controls communication between the lubricant reservoir and the airway and is lifted off its seat by air pressure in the airway to permit lubricant to pass thereinto from the lubricant reservoir.

According to the present invention an air-line oiler of this type (referred to hereinafter in the appended claims as "an air-line oiler of the type described") has in combination a valve passage which communicates between and is open at its opposite ends respectively to the airway and to the lubricant reservoir and has a valve seat therein, and a valve in the passage which substantially fills the cross-section thereof and is of such form and is so provided that when the air supply to the airway is shut off it is pressed on to its seat solely by pressure in the lubricant reservoir applied to that face of the valve open to the said lubricant reservoir.

By this means, when the supply of live air to the airway is cut off, the air entrapped under pressure within the reservoir will seat the valve and leakage of lubricant into the airway will therefore be prevented during idle periods of the machine or tool with which the oiler is being used.

Preferably the flow of lubricant from the lubricant reservoir is controlled by means of a porous or absorbent element or plug contained in the valve passage and in a preferred example such plug constitutes the body of the valve itself or is operatively connected with the valve so that the two are movable together.

In order that the invention may be more clearly understood a preferred construction will now be described in detail with the aid of the accompanying drawing, in which:—

Figure 1:
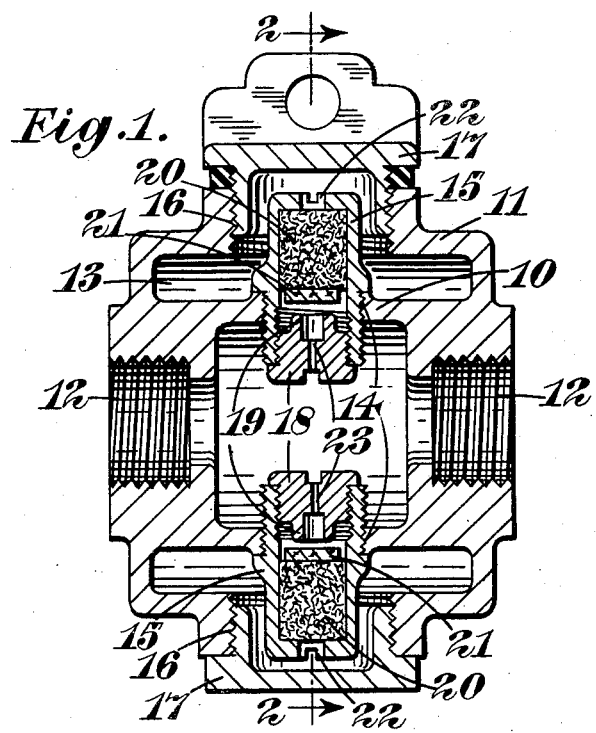
Figure 2:
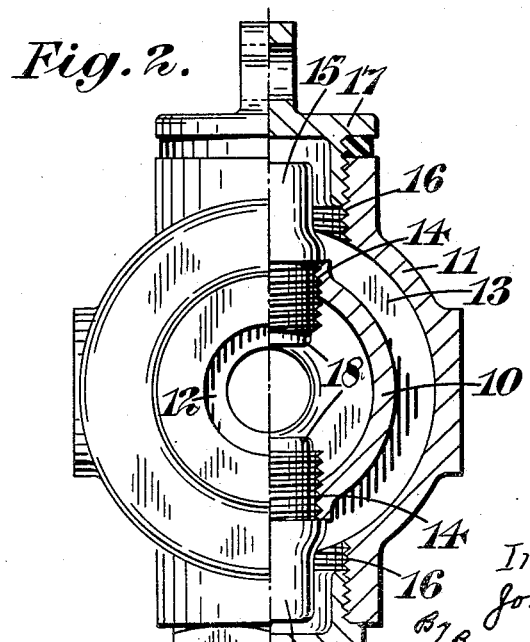

Figure 1 is a central section through the oiler in a plane containing the throughway axis of the airway, and Figure 2 is a part section on the line 2—2 of Figure 1 and a part elevation looking in the direction of the arrows.

Like reference numerals indicate like parts in both figures of the drawing.

The oiler is constituted by a casting of mainly tubular form comprising an inner wall 10 and an outer wall 11, both these walls being of cylindrical form and coaxial with the airway. The inner wall 10 constitutes a tubular airway section which comprises part of the airway through which live air is conducted to the tool. At both ends there are screwthreaded portions 12 to serve as couplings for the hose pipe through which live air is conveyed to the tool. One section of pipe leads from the source of compressed air to one of the screwthreaded portions 12, and another section of pipe leads from the other screwthreaded portion 12 to the tool.

Between the inner and outer walls 10 and 11 there is provided a chamber 13 constituting the lubricant reservoir above referred to. In the inner wall 10 there are formed two diametrically opposed apertures 14, the walls of which are screwthreaded to receive in each a chambered plug 15. In the outer wall 11 of the lubricant-reservoir there are two other apertures 16 coaxially arranged with respect to the apertures 14. Plugs 17 having screwthreaded engagement with the walls of the apertures 16 serve as closure plugs for those apertures. One of the orifices 16 may serve as a filling aperture through which lubricant is charged into the lubricant-reservoir and this aperture is conveniently the upper one illustrated in the drawing. By removing the plugs access may be had to the chambered plugs 15 and these chambered plugs can be inserted into position or withdrawn therefrom through the apertures 16.

Each chambered plug 15 comprises a metal tube having a nipple 18 screwthreaded into that end which projects into the air-way. The orifice 23 through the nipple is of such a size as to control the passage of lubricant through it into the air-way at the desired rate. The inner end of the nipple is formed with a reduced portion 19, the end of which constitutes a valve seat and behind the nipple, within the chambered plug, is a piston like wad 20 of absorbent material faced with a leather washer 21. Each composite wad 20, 21 constitutes a valve, the leather face of which is capable of seating on the valve seat of its associated nipple to close the passage through the latter.

The leather washer 21 for each plug is of smaller diameter than that of the absorbent material of the plug and the composite plug is movable bodily endwise within the chambered plug.

The end of each chambered plug opposite to that in which the nipple is situated is formed with an orifice 22 through which lubricant can enter from the lubricant-chamber. The nipple is, as before stated, removably secured, by means of a screwthreaded engagement, within the end of the chambered plug and when it is removed the composite plug can be inserted into position through the end in which the removable nipple will subsequently be inserted.

If desired, a compression spring (not shown) may be disposed between the plug and the shoulder formed at the junction between the reduced portion 19 and the body of the nipple 18 so as to assist in lifting the composite plug or valve from the seat when air pressure in the throughway approximates that in the reservoir.

In operation air under pressure passing through the air-way (i. e. the inner passage through the oiler terminating in the screwthreaded ends 12) will also pass through the orifices in the nipples to lift the composite plugs or valves from their seats to open the nipple orifices 23. As the diameter of each leather washer 21 is less than that of its plug 20, air can pass through the absorbent material of the plugs and the orifices 22 into the lubricant-reservoir and thus soon after admission of live air to the air-way the pressure in the reservoir will approximate that in the air-way. Owing to the reciprocating action of a rock-drill or similar tool, air pulsations will be set up in the air-way and these pulsations induce a flow of lubricant in small quantities from the absorbent plugs 20 through the nipples. Thus, the air in its passage through the airway picks up a quantity of lubricant and this quantity can be adjusted to requirements by predetermination of the cross-sectional area of the nipple orifices. The air thus lubricated passes to the tool that is to be operated.

When, however, the air supply is cut off from the air-way pressure therein immediately drops and will be reduced considerably below the pressure at that moment existing in the lubricant-chamber. Consequently, pressure on the plugs will force them inwardly into the plug-chambers to seat their washers or valves 21 on to the nipple seatings and thereby all leakage of lubricant into the air-way will be at once arrested.

It will, therefore, be seen that during the non-operating periods of the tool the valves constituted by the composite plugs will act efficiently to prevent any leakage from the lubricant-reservoir into the air-way and, therefore, when the tool is next started up there will be no surplus lubricant in the air-way to be carried to the tool.

Air-line oilers hitherto have generally suffered from the drawback that in the non-operative periods of the tools with which they are associated leakage of lubricant into the air-way occurs and on resumption of operations undesirable quantities of lubricant are carried along with the first rush of air into the tool, thereby resulting in over-lubrication and a waste of lubricant. Not only is this wastage objectionable on the ground of expense, but it is also objectionable on the ground that the lubricant-reservoir is emptied more rapidly than need be, thus necessitating more frequent refilling than will be the case with the present oiler. By preventing leakage of oil into the air-way the wastage is obviated and a single charge of lubricant into the reservoir will last for a longer period than when no measures are taken to prevent the leakage.

The invention is not limited to the particular form of valve described as a metal to metal valve may be employed and as further alternative the valve may be entirely separate from the plug with means such as a spring control to lift it from its seat when the plug is moved outwardly. The plug, however, in this case would still be the medium by which the valve would be seated when the supply of air is cut off from the air-way.

Furthermore, the invention is not limited to the use of a plug of absorbent material or to the use of a plug at all.

Where reference is made herein to "air" as the fluid medium with which the lubricator is to operate it is to be understood that this term is used to denote a typical fluid medium for operating machine tools, but the term "air" is to be understood to mean and to include, where the context permits, any other fluid driving medium, such, for example as steam.

Although only one aperture such as 22 has been shown in each plug-chamber it will be understood that more than one such aperture may be provided.

I claim:

1. An air-line oiler comprising in combination a lubricant-reservoir, an airway, a valve passage communicating between and opening at its opposite ends respectively to the airway and the lubricant-reservoir, a valve seat in the said passage and a valve in the passage arranged to be seated solely by pressure remaining in the reservoir when air supply to the airway is cut off, and thereby to arrest further flow of lubricant from the lubricant reservoir.

2. An air-line oiler according to claim 1 in which the valve is of such dimensions as substantially to fill the cross-section of the passage.

3. An air-line oiler according to claim 1 in which the valve comprises a porous plug through which lubricant passes from the reservoir to the airway.

4. An air-line oiler according to claim 1 in which the valve is operatively connected with a porous plug through which lubricant passes from the reservoir to the airway.

5. An air-line oiler according to claim 1 in which the valve comprises a porous plug faced with non-porous material to constitute a seating valve face.

6. An air-line oiler according to claim 1 in which the valve is operatively connected with a porous plug through which lubricant passes from the reservoir to the airway and in which the plug is faced with non-porous material to constitute a seating valve face.

7. An air-line oiler according to claim 1 having the valve chamber detachably secured in position, an orifice in a surrounding wall of the airway into which the valve chamber is insertable into position, an outlet from the valve chamber for the discharge of lubricant into the airway and an orifice in the valve chamber to admit lubricant from the reservoir to that side of the valve remote from the outlet.

8. An air-line oiler according to claim 1 having a valve chamber detachably secured in position, an orifice in a surrounding wall of the airway into which the valve chamber is insertable into position, an outlet from the valve chamber for the discharge of lubricant into the airway, an orifice in the valve chamber to admit lubricant from the reservoir to that side of the valve remote from the outlet, and a valve structure comprising a porous element and so situated within the valve chamber that lubricant will pass into and through the porous material before reaching the outlet.

9. For an air-line oiler, the combination of a valve chamber formed to be detachably secured within a wall of an airway, means for securing it therein, an outlet from the valve chamber to communicate with the airway when the chamber is in position, a valve within the valve chamber to co-operate with the outlet and an inlet orifice in the valve chamber opening to that side of the valve remote from the outlet.

10. For an air-line oiler, the combination of a valve chamber formed to be detachably secured within a wall of an airway, means for securing it therein, an outlet from the valve chamber to communicate with the airway when the chamber is in position, a valve within the valve chamber to co-operate with the outlet and an inlet orifice in the valve chamber opening to that side of the valve remote from the outlet, the said valve being composed at least in part of porous material.

11. For an air-line oiler, a unit assembly comprising a valve chamber, means associated therewith whereby it may be detachably secured within a wall of an airway, a valve member and a porous plug located in the valve chamber, an outlet from the valve chamber which, when the chamber is in position in the airway, will serve to lead from the valve chamber into the airway, and an inlet in the valve chamber, the said inlet and outlet being situated on opposite sides of the valve.

12. An air-line oiler having in combination an element comprising a central throughway to constitute part of an air-line, a surrounding annular jacket affording a lubricant-reservoir, coaxially situated orifices in the walls of the throughway and of the surrounding jacket, a tubular valve chamber inserted in the orifice in the wall of the throughway by entry through the coaxial orifice in the jacket, a valve comprising a porous plug within the valve chamber, an outlet at that end of the valve chamber which opens into the throughway, an inlet at the opposite end of the valve chamber communicating with the jacket space, and a closure plug for the orifice in the jacket, the said valve being arranged to seat on the outlet solely by air pressure within the reservoir when air that has been supplied through the throughway is cut off.

13. An air-line oiler having in combination an element comprising a central throughway to constitute part of an air-line, a surrounding annular jacket affording a lubricant-reservoir, a plurality of pairs of coaxially situated orifices in the walls of the throughway and of the surrounding jacket, tubular valve chambers one inserted in each orifice in the wall of the throughway by entry through a coaxial orifice in the jacket, a valve comprising a porous plug within each valve chamber, an outlet at that end of each valve chamber which opens into the throughway and an inlet at the opposite end of each valve chamber communicating with the jacket space, and a closure plug for each orifice in the jacket, each said valve being arranged to seat on its co-operating outlet solely by air pressure within the reservoir when air that has been supplied through the throughway is cut off.

14. An air-line oiler having in combination an element comprising a central throughway to constitute part of an air-line, a surrounding annular jacket affording the lubricant-reservoir, coaxially situated orifices in the walls of the throughway and of the surrounding jacket, a tubular valve chamber inserted in the orifice in the wall of the throughway by entry through the coaxial orifice in the jacket, a valve comprising a porous plug within the valve chamber, an outlet at that end of the valve chamber which opens into the throughway, a nipple secured within the outlet and affording a valve seat, an inlet at the opposite end of the valve chamber communicating with the jacket space, and a closure plug for the orifice in the jacket, the said valve being arranged to seat on the outlet solely by air pressure within the reservoir when air that has been supplied through the throughway is cut off.

15. An air-line oiler having in combination an element comprising a central throughway to constitute part of an air-line, a surrounding annular jacket affording a lubricant-reservoir, a plurality of pairs of coaxially situated orifices in the walls of the throughway and of the surrounding jacket, a plurality of tubular valve chambers inserted one in each orifice in the wall of the throughway by entry through the coaxial orifice in the jacket, a valve comprising a porous plug within each valve chamber, an outlet at that end of each valve chamber which opens into the throughway, a nipple secured within each outlet and affording a valve seat, an inlet at the opposite end of each valve chamber communicating with the jacket space, and a closure plug for each orifice in the jacket, each said valve arranged to seat on its associated outlet solely by air pressure within the reservoir when air that has been supplied to the throughway is cut off.

JOHN BLISS.